United States Patent [19]

Highfill

[11] Patent Number: 4,803,058
[45] Date of Patent: Feb. 7, 1989

[54] MOISTURIZED COMPOSITIONS OF HYDRATE-FORMING PHOSPHATES AND METHODS FOR PREPARATION THEREOF

[75] Inventor: Louis A. Highfill, Union, Mo.

[73] Assignee: Monsanto Company, St. Louis, Mo.

[21] Appl. No.: 193,024

[22] Filed: May 12, 1988

Related U.S. Application Data

[60] Division of Ser. No. 30,091, Mar. 31, 1987, Pat. No. 4,770,865, which is a continuation-in-part of Ser. No. 901,920, Aug. 29, 1986, abandoned.

[51] Int. Cl.$^4$ .................. B01F 1/00; C09K 3/00; C11D 7/16; C11D 17/06
[52] U.S. Cl. ........................ 252/135; 252/91; 252/174.13; 252/363.5; 252/383; 252/384; 252/385; 252/538; 252/539; 252/DIG. 1; 423/267; 423/268; 423/274
[58] Field of Search .............. 252/91, 99, 135, 174.13, 252/363.5, 383, 384, 385; 423/267, 268, 274

[56] References Cited

U.S. PATENT DOCUMENTS

| | | | |
|---|---|---|---|
| 3,181,953 | 5/1965 | Van Ness | 99/78 |
| 3,248,330 | 4/1966 | Feierstein | 252/99 |
| 3,250,624 | 5/1966 | Van Ness | 99/78 |
| 3,328,173 | 6/1967 | Van Ness | 99/78 |
| 3,361,675 | 1/1968 | Fuchs et al. | 252/99 |
| 3,446,580 | 5/1969 | Fuchs | 23/106 |
| 3,714,051 | 1/1973 | Milesi | 252/135 |
| 3,812,045 | 5/1974 | Gray | 252/99 |
| 3,922,332 | 11/1975 | Schenk | 423/268 |
| 4,113,644 | 9/1978 | Ashcraft | 252/91 |
| 4,328,114 | 5/1982 | Johnson et al. | 252/135 |
| 4,411,809 | 10/1983 | Wixon | 252/91 |

Primary Examiner—Dennis Albrecht
Attorney, Agent, or Firm—R. Loyer; A. Cole; R. Shear

[57] ABSTRACT

A composition of matter in particulate, crystalline form. The composition comprises a hydrate-forming phosphate selected from the group consisting of sodium tripolyphosphate, sodium pyrophosphate and trisodium phosphate, between about 0.1% by weight and about 23% by weight added water in the form of water of hydration said water containing in solution sufficient surfactant to provide the composition from about 0.20 ppm and about 125 ppm of a surfactant. Methods for preparing such compositions are also disclosed.

14 Claims, 3 Drawing Sheets

4,803,058

MOISTURIZED COMPOSITIONS OF HYDRATE-FORMING PHOSPHATES AND METHODS FOR PREPARATION THEREOF

This is a division of Application Ser. No. 030,091, filed Mar. 31, 1987 now U.S. Pat. No. 4,770,865, which is a continuation-in-part of application Ser. No. 901,920, filed Aug. 29, 1986 now abandoned.

BACKGROUND OF THE INVENTION

The present invention relates to the production of hydrate-forming phosphates, and more particularly to novel moisturized, crystalline compositions of hydrate-forming phosphates and methods for production thereof.

For many years, a heavy demand for sodium tripolyphosphate (STP) has resulted from its many uses, particularly as a detergent builder and in the processing of food products. However, conventional STP compositions have several drawbacks. For example, currently available STP compositions do not dissolve in water as rapidly as is desired, that is, their rates of solution are not as high as desired. The rate of solution of an STP composition has been linked to the composition's rate of hydration. Moreover, the powder form of STP compositions tends to cake, creating serious problems, as discussed below.

Conventionally, the manufacture of STP involves a process such as that disclosed in U.S. Pat. Nos. 3,233,967 to Shen and calcining the tripolyphosphate so produced at a temperature of between 200° C. and 600° C. Calcining at temperatures between about 250° C. and about 375° C. results in the production in what is known as Phase II STP. Relatively higher calcining temperatures, i.e., those in excess of 417° C., and preferably in excess of 550° C., produce what is known as Phase I STP. Phase II STP has a lower rate of hydration than Phase I, and so a lower rate of solution, but has flow properties superior to Phase I STP and, due to the lower calcining temperature required, it is far less expensive to manufacture than Phase I STP.

Commercially available STP ordinarily comprises a blend of the two phases. Blending of the two phases to various relative proportions allows the characteristics of the resulting STP blend to be varied to some degree. Thus, blends of Phase I STP and Phase II STP have been utilized as a compromise of the desirable and undesirable characteristics of each STP phase. Ordinarily, 20% by weight to 50% by weight of commercial STP is found to be Phase I STP.

However, since such mixtures are compromises between the advantages as well as the disadvantages of two phases of STP, the STP blends have several drawbacks. It is desired that the blends more readily hydrate and dissolve in water, that is, that they have higher rates of hydration in shorter periods of time. While Phase I STP has a higher rate of hydration than does Phase II STP, the rate of hydration even of Phase I STP is not as high as desired. In addition, Phase I STP tends to cake, and this tendency to cake and form clumps results in generally poor flow characteristics. During shipment, oftentimes large volumes of STP cake so as to form in the cargo vessel a large, hardened block of STP, the removal of which requires an expensive process, commonly involving pneumatic hammers. Moreover, due to the higher calcining temperature required for the production of Phase I STP, Phase I STP tends to be far more expensive, as much as 40% more expensive, to manufacture than Phase II STP. Some manufacturers add a small amount of potassium to aid in the conversion of Phase II STP to Phase I STP.

More specifically, crystalline STP compositions are generally useful in either powder or granular form, each form having drawbacks peculiar to that form, as will be discussed below. In the powder form, generally 60% to 70% of the particles are smaller than 270 mesh, and essentially all the particles are smaller than 60 mesh. On the other hand, in granular form, at least 40% of the particles exceed 60 mesh, while all particles (except for a trace) exceed 100 mesh. Both STP composition forms are useful in detergents as builders. As a builder, STP tends to chelate calcium and magnesium ions found in tap water, thereby softening the water and aiding the detergent's cleaning action. In application as a builder, it is desirable that both STP composition forms dissolve and hydrate quickly and completely. Accordingly, both forms of the composition should have high rates of hydration in short periods of time, and therefore, high rates of solution. Moreover, it is desired that the rates of hydration, and thus, rates of solution, of STP compositions be more consistent in order to achieve more predictable results. In other words, it is desired that the rates of hydration be more consistent from sample to sample of STP composition.

Powder STP compositions are used in ordinary household detergents. Typically, water is added to such compositions in order to increase the rate of hydration. A high rate of hydration is particularly desirable in the processing of materials for formulating detergents since a high rate of hydration indicates that heat will be given off during the processing, thereby aiding the processing. Aside from the desirability of having a high rate of hydration in a short period of time, it is important that the powder remain free-flowing and resist caking. However, the addition of water for increasing the rate of hydration tends to exacerbate caking. As described above, caking of STP compositions during storage and shipment creates severe problems.

Granular STP compositions are typically used in a dry mix detergent for commercial dishwashing by agglomerating granular STP with other detergent ingredients, such as soda ash and silicates into a solid block that is placed in the commercial washing machine. Thus, it is important that the STP dissolve at rate near that of the other ingredients in the detergent block. Accordingly, use of Phase II STP in such applications suffers disadvantages because Phase II STP has a low rate of hydration and the other detergent block ingredients tend to dissolve before the STP. For at least two reasons, use of Phase I STP or a mixture of the two phases does not adequately solve this problem. First, as explained, Phase I STP is relatively expensive to manufacture. Second, it is desired that the STP have a rate of hydration higher even than that of conventional Phase I STP.

In attempts to solve the problems with granular Phase II STP, it has been found that the addition of water may produce Phase II STP with a rate of solution equivalent to that of Phase I STP. However, several problems still remain. Addition of water in an amount necessary to produce such a rate of solution in Phase II STP results in a STP composition which is difficult to proves, and therefore expensive to manufacture. Moreover, it is desired that the STP have a rate of solution still higher than that achieved in such a manner. Thus, an STP composition is desired which has a higher rate of solution, and which requires less water to achieve it.

For decades, the industry has attempted to solve the severe drawbacks of the conventional STP compositions. These attempts, however, have met with little success. As a result, while STP is important to several industries, the disadvantages have proved troublesome and costly and the use and sales of STP have suffered as a result.

Problems similar to those attending to STP compositions are encountered with other compositions of hydrate-forming phosphates, that is, other phosphates which are capable of forming hydrates, particularly sodium pyrophosphate and trisodium phosphate, also tend to cake in the presence of water. Further, as with STP, it is desired that these other phosphates also have higher rates of solution.

U.S. patents relating to phosphate compositions and detergents include U.S. Pat. No. 3,233,967 to Shen, issued Feb. 8, 1966; U.S. Pat. No. 3,244,478 to Stahlheber, issued Apr. 5, 1966; U.S. Pat. No. 3,248,330 to Feierstein et al., issued Apr. 26, 1966; U.S. Pat. No. 3,397,947 to Shaver, issued Aug. 20, 1968; U.S. Pat. No. 3,397,948 to Mesmer, issued Aug. 20, 1968; 3,426,440 to Shen et al., issued Feb. 11, 1969.

SUMMARY OF THE INVENTION

Among the several objects of the invention, therefore, may be noted the provision of particulate, crystalline compositions of hydrate-forming phosphates having improved rates of hydration; the provision of such compositions that have more consistent rates of hydration; the provision of such compositions, particularly those in granular form, that require relatively low concentrations of water, yet have such desirable rates of hydration; the provision of such compositions in powder form that resist caking and are free-flowing; the provision of particulate, crystalline sodium tripolyphosphate compositions that have improved rates of hydration; the provision of such sodium tripolyphosphate compositions that have more consistent rates of hydration; the provision of such sodium tripolyphosphate compositions, particularly those in granular form, that require relatively low concentrations of water; the provision of such sodium tripolyphosphate compositions in powder form that resist caking and are free-flowing; and the provision of a process for producing such sodium tripolyphosphate compositions.

In accordance with this invention, there has been discovered a particulate, at least partially hydrated, crystalline form of phosphate composition comprising a sodium tirpolyphosphate, sodium pyrophosphate or trisodium phosphate and from about 0.1% by weight to about 23% by weight added water, said water at the time of addition to the phosphate containing in solution sufficient surfactant to provide the composition with from about 0.2 ppm to about 125 ppm surfactant. Compositions of this invention have been found to have a rate of hydration superior to those of conventional crystalline phosphate compositions in those instances of incomplete hydration and in all instances superior product uniformity.

The powder form of the compositions of this invention have been found to have greatly reduced caking tendency and in most instances are practically non-caking.

In the granular form, compositions of this invention also have been found to have greatly reduced caking tendency and are practically non-caking in practice because the granular form can be prepared by addition of about one-half as much water as required in prior art processes such as in U.S. patent 3,361,675 to Fuchs, et al. Surprisingly, the fully hydrated form of phosphate compositions of this invention are prepared without the expected lumping or caking in process equipment and even more surprisingly with little or no subsequent milling. Fully hydrated phosphate compositions of this invention contain in the range of from about 21% to about 23% by weight water and from about 100 ppm to about 125 ppm surfactant. The fully hydrated phosphate compositions of this invention are particularly useful in slurry detergent formulations when in the granular form.

Of course phosphate compositions of this invention can be prepared containing any amount of water in the range of from about 0.1% to about 23% by weight and any amount of surfactant in the range of from about 0.2 ppm to about 125 ppm. In accordance with this invention, a surfactant is any compound that reduces surface tension when dissolved in water or water solutions, or which reduces interfacial tension between two liquids, or between a liquid and a solid. Surfactants may be detergents, wetting agents and emulsifiers, all have the same basic chemical mechanism and differ chiefly in the nature of the surfaces involved.

The invention is further directed to a method for the preparation of a particulate, crystalline, sodium tripolyphosphate composition which comprises contacting crystalline sodium tripolyphosphate containing less than about 0.1% by weight water with an aqueous solution of a surfactant to produce a particulate, crystalline, sodium tripolyphosphate composition comprising between about 0.1% by weight and about 23% by weight water in the form of water of hydration and between about 0.2 ppm and about 125 ppm of the surfactant.

The invention is further directed to a method for the preparation of a particulate, crystalline, sodium tripolyphosphate composition in which sodium tirpolyphosphate is first calcined to produce an unmilled calcined product. Then, the unmilled calcined product is contacted with an aqueous solution of a surfactant to produce a particulate, crystalline, sodium tripolyphosphate composition comprising between about 0.1% by weight and about 23% by weight water in the form of water of hydration and between about 0.2 ppm and about 125 ppm of the surfactant. The invention is further directed to such a method in which the unmilled calcined product is milled to form a milled calcined product before being contacted with an aqueous solution of surfactant to produce a particulate, crystalline, sodium tripolyphosphate composition comprising between about 0.1% by weight and about 23% by weight water in the form of water of hydration and between about 0.2 ppm and about 125 ppm of the surfactant.

DESCRIPTION OF THE PREFERRED EMBODIMENTS

Figure 1:
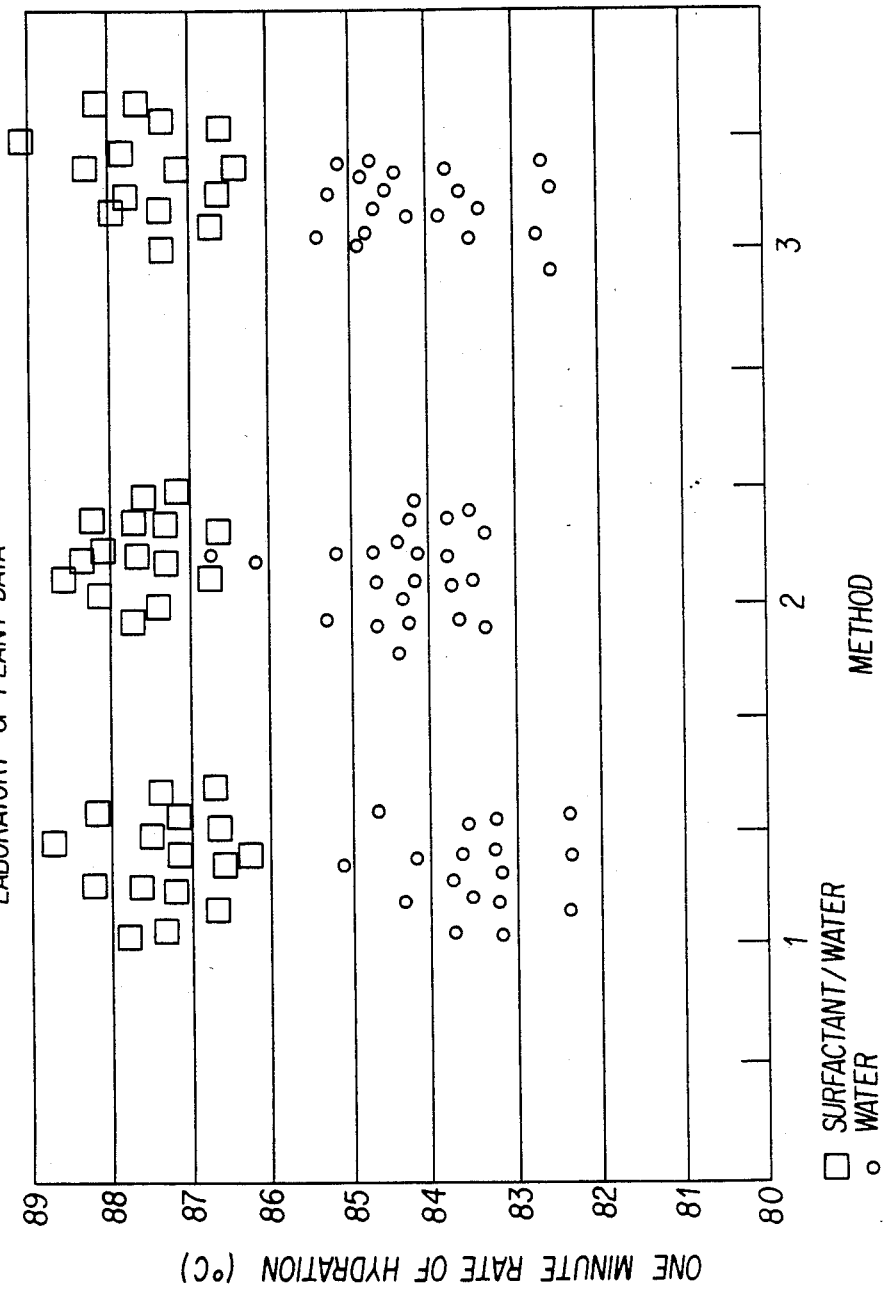
FIG. 1 is a graph showing the one minute rate of hydration for several STP compositions produced by various methods.

In accordance with the present invention, it has been discovered that a phosphate composition of particulate, crystalline form, that comprises sodium tripolyphosphate, sodium pyrophosphate or trisodium phosphate as a hydrate-forming phosphate, between about 0.1% by weight and about 23% by weight added water in the form of water of hydration, said water containing from about 0.2 ppm and about 125 ppm of a surfactant at the time of addition, has a rate of hydration superior to those of conventional crystalline phosphate compositions. In a preferred embodiment of the invention, it has been found that such a composition containing sodium tirpolyphosphate as the hydrate-forming phosphate has a rate of hydration superior to those of conventional crystalline sodium tripolyphosphate compositions.

Such novel hydrate-forming phosphate compositions, including STP compositions, have several other advantages. In addition to being higher, the rates of hydration of these compositions tend to be more consistent than the rates of hydration of conventional crystalline, compositions of hydrateforming phosphates. That is, there is less of a variation of the rate of hydration from sample to sample than observed with conventional crystalline hydrate-forming phosphate compositions. Thus, the rate of hydration, and rate of solution, is more predictable.

In the granular form, it has been found that in order to develop an acceptable rate of solution, 4% by weight moisture content is required of conventional crystalline compositions of hydrate-forming phosphates, for example, STP compositions, and particularly Phase II STP compositions, while the compositions of this invention have even superior rates of solution with only 2% by weight moisture. It is thus obvious that the granular compositions of the invention containing lesser amounts of combined water possess the economic advantage of having more usable phosphate per pound of product.

In the powder form it has been found that the compositions of this invention are far less likely to cake under normal conditions, and are far more likely to remain free-flowing, than are the conventional hydrate-forming phosphate compositions.

The invention is further directed to a novel method for the preparation of such particulate, crystalline, sodium tripolyphosphate compositions. In the method, crystalline sodium tirpolyphosphate containing less than about 0.1% by weight water is contacted with an aqueous solution of a surfactant to produce a particulate, crystalline, sodium tripolyphosphate composition comprising between about 0.1% by weight and about 23% by weight water in the form of water of hydration and between about 0.2 ppm and about 125 ppm of the surfactant. The novel method of the invention may be carried out by first calcining the sodium tripolyphosphate to produce an unmilled calcined product and then contacting the unmilled product with an aqueous solution of a surfactant to produce particulate, crystalline, sodium tripolyphosphate composition comprising between about 0.1% by weight and about 23% by weight water in the form of water of hydration and between about 0.2 ppm and about 125 ppm of the surfactant. Alternatively, the unmilled product may be milled before contacting it with an aqueous solution of a surfactant.

The hydrate-forming phosphates of this invention are those phosphate compounds that are capable of forming stable hydrates, particularly sodium tirpolyphosphate (STP), sodium pyrophosphate and trisodium phosphate. The preferred species of sodium tripolyphosphate comprises $Na_5P_3O_{10}$, but may include other compounds comprising the $(P_3O_{10})^{-5}$ anion and at least one sodium cation.

In accordance with this invention, a surfactant is any compound that reduces surface tension when dissolved in water or water solutions, or which reduces interfacial tension between two liquids, or between a liquid and a solid. Surfactants may be detergents, wetting agents and emulsifiers, all have the same basic chemical mechanism and differ chiefly in the nature of the surfaces involved.

While a wide variety of anionic nonionic and cationic surfactants, such as those known by the trade designations Olin Poly-Tergent SLF-18 (nonionic), manufactured by Olin Chemicals, Aerosol OT (anionic dioctyl sodium sulfosuccinate), manufactured by American Cyanamid, Neodol 25-9 (nonionic), sold by Shell Chemical Co., Sterox NJ (nonionic), manufactured by Monsanto, Stepan SXS (anionic), manufactured by Stepan Chemical, LAS (nonionic linear alkyl sulfonate), manufactured by Monsanto, and Pluronic 25-R2 (nonionic), manufactured by BASF Wyandotte, have been found to be equally effective, to facilitate production of the compositions of this invention, low-foaming surfactants may be preferred. Thus, it has been discovered that a concentration between about 200 ppm and 500 ppm of any of the above-noted surfactants in water to be added to moisturize dry (less than 0.1% by weight water) compositions of hydrate-forming phosphates is optimal. Accordingly, since the resulting moisturized compositions of this invention have a moisture content of preferably between about 0.1% by weight and about 4% by weight, the surfactant is present in a concentration of between about 0.2 ppm and about 20 ppm. For the most preferred range of moisture content for the compositions of this invention, i.e., between about 0.5% by weight and about 2% by weight, the surfactant is present in a concentration of between about 1 and about 10 ppm. It will be understood that various commercially available surfactants other than those mentioned above, may be utilized in the practice of the invention. If it is desired to prepare more hydrated form of phosphates, up to and including fully hydrated material, added water may provide as much as about 23% by weight of the compositions, said water containing up to about 500 ppm surfactant.

The compositions of this invention are typically prepared from calcined hydrate-forming phosphate compounds. The aforementiond U.S. Pat. No. 3,233,967 details a typical calcining process involving STP. For STP, the calcining temperature depends upon the phase of STP desired. As noted above, calcining at a temperature of below about 375° C. results in Phase II STP, while a temperature of above about 417° C. results in Phase I STP.

Upon emerging from the calciner, the crystalline, nearly pure hydrate-forming phosphate compound, for example, STP, is anhydrous and bone-dry. It is transferred to a cooler discharge screw and cooled to between about 25° C. and 80° C. While the calcined product is normally bone-dry at this point, during its transfer to the cooler discharge screw, it is possible that the product has absorbed some moisture, and may contain up to about 0.1% by weight water. In the cooler discharge screw, the calcined product may be sprayed with an aqueous surfactant solution having a concentration of surfactant of between about 200 ppm and 500 ppm so that the moisturized product contains between about 0.1% by weight and about 23% by weight, preferably between about 0.5% by weight and about 2% by weight, water in the form of water of hydration. Accordingly, the concentration of surfactant in the product is between about 0.2 ppm and about 20 ppm, preferably between about 1 ppm and 10 ppm. From the cooler discharge screw, the moisturized product is transferred to a mill where it is milled or ground into granules or powder or both.

Alternatively, the product may be kept dry in the cooler discharge screw, transferred to a mill and the dry product milled to powder or granules or both. In this method, the dry powder is then moisturized with the surfactant solution described above in a fluidized blender. The dry granules are moisturized in a mechanical blender. On the other hand, if so desired, the moisturization may take place during the milling procedure.

Powder STP composition may also be produced by first producing moisturized granules as set forth above, and then milling the granules to powder.

The partially hydrated phosphate compositions thus manufactured tend to have higher rates of solution. The rate of solution is ordinarily determined by the rate of hydration. Rate of hydration of an STP composition may be measured by adding 150 grams of the STP composition to an 80° C. solution containing anhydrous sodium sulfate (50gm.) in wate (200ml) and measuring the temperature rise of the solution. A higher temperature at an earlier time indicates a faster rate of hydration. For an STP composition comprising between about 0.5% by weight and about 2% by weight water in the form of water of hydration and between about 1 ppm and 10 ppm surfactant, the rate of hydration at one minute after addition of the composition (the one-minute rate of hydration value) has been found to be about 90° C., and the rate of hydration at five minutes after addition of the composition (the five-minute rate of hydration value) has been found to be about 92° to 93° C. These rates of hydration are far superior to the rates for conventional STP compositions of comparable water content. For such conventional compositions, the one-minute rate of hydration value has been found to be about 83%C, and the five-minute rate of hydration value has been found to be about 90° C.

Typically, as with the prior art STP compositions, the content of STP in the compositions of this invnetion comprise between about 85% and about 94% STP. Other components ordinarily found in the compositions include sodium pyrophosphate, sodium trimetaphosphate and sodium orthophosphate. As noted, the preferred compositions produced as outlined comprise between about 0.1% by weight and about 4% by weight water in the form of water of hydration, and between about 0.2 ppm and about 20 ppm surfactant. For the most preferred range of moisture content for the compositions of this invention, i.e., between about 0.5% by weight and about 2% by weight, the surfactant is present in a concentration of between about 1 and 10 ppm. In addition trace amounts of potassium are commonly found in STP compositions. The bulk density of the granular form of the composition tends to be between 0.4 and 1.1 gm./cm3.

While not wishing to be bound to any particular theory, it is believed that the low level of surfactant lowers the surface tension of the water sufficiently so that the water more readily flows throughout the STP and contact between the water and STP in the crystals is increased. As a result, a much larger portion of the added water will be bound to the STP and found within the STP crystals as the hexahydrate of STP than is found in STP without the surfactant. In the conventional compositions, much of the water does not bind to the STP, but remains as free water whcih tends to cause adhesion between the crystals, resulting in caking. The higher and more even hexahydrate distribution in the composition is believed to produce the higher and more consistent rates of hydration of the compositions of this invention. It is also believed that the hydrated crystals act as seeds to aid further hydration. Further, it is believed that the surfactant particles are distributed throughout the STP within the crystals.

Powder STP compositions are used in ordinary household detergents. Aside from the desirability of having a high rate of hydration in a short period of time, it is important that the powder remain free-flowing and resist caking. As decribed above, caking of STP compositions during storage and shipment creates severe problems. It has been found that the compositions of this invention, even those containing Phase I STP, tend to remain free-flowing. It also has been found that the compositions of this invention wherein the less expensive Phase II STP makes up all the STP may be used due to the acceptable rate of hydration.

Granular STP compositions are typically used in a dry mix detergent for commercial dishwashing by agglomerating granular STP with other detergent ingredients, such as soda ash and silicates into a solid block that is placed in commercial washing machines. It has been found that the STP compositions of this invention have improved rates of solution so that they dissolve at rate near that of the other ingredients in the detergent block. This has been found to be true even for the compositions of this invention wherein the less expensive Phase II STP makes up all the STP.

The folloiwng examples illustrate the practice of the invention.

EXAMPLE 1

Cooled, calcined anhydrous STP blends were moisturized by placing one kilogram in the mixing bowl of a Hobart Kitchen Aid (TM) Model K45SS mixer and stirred at medium speed to simulate the movement of the cooler product in a cooler screw conveyor. A weighed amount of water with or without surfactant, depending on the test, was added with a Crown Spratool (TM), Model 8011, which produces a fine mist. As noted in the table, the water thus introduced containing either no surfactant or 500 ppm surfactant. The surfactant used in these trials was Olin Poly-Tergent SLF-18. The moisturized product as coarse milled with a cereal grain attachment on the Hobart mixer, and then milled to a powder with a six-inch Raymond hammer mill.

The proportion of Phase I STP to Phase II STP of each sample was determined by adding a portion of the sample (50 gms.) to glycerine at room temperature, mixing, recording the temperature and adding water (25 gms.) at room temperature and measuring the maximum temperature rise (TR) in degrees Celsius of the solution. By subtracting 6 from the temperature rise and multiplying by four, the percentage of Phase I STP in the mixture in the blend is determined. For example, if TR=14.2, % Phase I=4(14.2-6)=32.8% Phase I in the blend. The moisture levels of the samples were determined by the standard loss on drying method. The rates of hydration of the blends were measured by adding 150 grams of the STP composition to an 80° C. solution containing anhydrous sodium sulfate (50 gm.) in water (200 ml) and measuring the temperature rise of the solution.

Figure 2:
FIG. 2 is a graph showing the five minute rate of hydration for several STP compositions produced by various methods.

Method 3 were moisturized by a combination of the first two methods. FIGS. 1 and 2 plot the rate of hydration for each of the methods derived from the data obtained from tests on routine samples taken over two days on blends moisturized to 0.5% with water containing 500 ppm Olin SLF-18 surfactant (indicated by squares), as well as the data obtained from tests on rou-

| TR (°C.) | PHASE I CONTENT (Wgt. %) | SURFACTANT CONTENT OF WATER SPRAY | CONCENTRATION OF WATER IN BLEND (Wgt. %) | RATE OF 1 MIN. | HYDRATION 5 MIN. |
|---|---|---|---|---|---|
| 14.2 | 32.8 | 0 | 0.16 | 82.4° C. | 92.6° C. |
| 14.2 | 32.8 | 500 ppm | 0.50 | 86.6° C. | 93.8° C. |
| 14.2 | 32.8 | 0 | 0.50 | 82.7° C. | 91.2° C. |
| 12.5 | 26.0 | 0 | 0 | 82.3° C. | 80.3° C. |
| 12.5 | 26.0 | 500 ppm | 0.50 | 87.9° C. | 92.5° C. |
| 12.5 | 26.0 | 0 | 0.50 | 81.9° C. | 83.2° C. |
| 6.2 | 0.8 | 0 | 0.50 | 80.4° C. | 84.3° C. |
| 6.2 | 0.8 | 500 ppm | 0.50 | 83.6° C. | 92.9° C. |
| 6.2 | 0.8 | 0 | 0 | 78.4° C. | 80.2° C. |
| 13.8 | 31.2 | 0 | 0 | 82.1° C. | 88.7° C. |
| 13.8 | 31.2 | 500 ppm | 0.50 | 87.6° C. | 93.7° C. |
| 13.8 | 31.2 | 0 | 0.50 | 87.4° C. | 92.9° C. |
| 14.7 | 34.8 | 0 | 0.50 | 84.6° C. | 90.9° C. |
| 14.7 | 34.8 | 500 ppm | 0.50 | 87.6° C. | 93.4° C. |
| 14.7 | 34.8 | 0 | 0 | 80.7° C. | 82.6° C. |
| 12.2 | 24.8 | 0 | 0.50 | 83.9° C. | 91.7° C. |
| 12.2 | 24.8 | 500 ppm | 0.50 | 86.8° C. | 93.9° C. |
| 14.2 | 32.8 | 0 | 0.50 | 82.7° C. | 91.2° C. |
| 14.2 | 32.8 | 100 ppm | 0.50 | 82.6° C. | 92.1° C. |
| 14.2 | 32.8 | 250 ppm | 0.50 | 84.5° C. | 93.0° C. |
| 14.2 | 32.8 | 500 ppm | 0.50 | 86.6° C. | 93.8° C. |
| 14.2 | 32.8 | 1000 ppm | 0.50 | 86.8° C. | 93.4° C. |

EXAMPLE 2

Moisturized STP powder blends were produced as described in Example 1, except that the type of surfactant was varied from test to test. The added water contained either no surfactant or 500 ppm surfactant of a surfactant as indicated in the table below.

The proportion of Phase I STP to Phase II STP of each sample was determined as set forth in Example 1. The TR for each sample was 15.05. The samples comprised 36.2% Phase I. The moisture level of each sample was 0.5% as determined by the standard loss on dryng method. The rates of hydration of the blends were measured as set forth in Example 1.

| SURFACTANT | RATE OF 1 MIN. | HYDRATION 5 MIN. |
|---|---|---|
| None | 84.5° C. | 90.9° C. |
| Olin SLF-18 | 88.4° C. | 93.4° C. |
| Aerosol OT | 88.0° C. | 93.6° C. |
| Neodol 25-9 | 89.6° C. | 94.7° C. |
| Sterox NJ | 90.3° C. | 94.5° C. |
| Stepan SXS | 89.7° C. | 94.9° C. |
| LAS | 88.9° C. | 94.7° C. |
| Pluronic 25-R2 | 89.9° C. | 94.0° C. |

The surfactant-free composition was found to cake when stored for two weeks at 22.2° C. and 80% relative humidity. None of the other samples caked after storage under the same conditions.

EXAMPLE 3

Moisturized STP powder blends (TR's ranging from 10° to 18° C.) were produced on a plant production scale and basis. The blends designated in the table below as Method 1 were sprayed in a fluidized blender. Those designated as Method 2 were sprayed in the cooler discharge screw before milling. Those designated as tine samples taken over six months of production in which the moisturizing water contained no surfactant (indicated by circles). The samples were tested as described in Example 1. FIG. 1 plots the one-minute rate of hydration, while FIG. 2 plots the five-minute rate of hydration. The table below shows the averages for the data derived from the production using surfactant.

| METHOD | MEAN TR | MEAN RATE OF 1-MINUTE | HYDRATION 5-MINUTE |
|---|---|---|---|
| 1 | 12.5 | 88.6° C. | 93.4° C. |
| 2 | 13.0 | 88.8° C. | 93.7° C. |
| 3 | 13.4 | 88.8° C. | 93.2° C. |

The following table below shows the averages for the date derived from the production without sufactant.

| METHOD | MEAN TR | MEAN RATE OF 1-MINUTE | HYDRATION 5-MINUTE |
|---|---|---|---|
| 1 | 15.8 | 83.5° C. | 91.0° C. |
| 2 | 13.5 | 87.0° C. | 93.0° C.* |
| 3 | 13.8 | 85.9° C. | 91.2° C. |

*These values are estimates.

EXAMPLE 4

A batch of STP powder composition was produced by blending High Temperature Rise STP powder and Ultra High Temperature Rise STP powder in a fluidized blender and moisturizing with water (132.5 L) containing Olin Poly-Tergent SLF-18 surfacant (57 gms.) as follows. A 213 L steel drum was placed two feet above a centrifugal pump used to supply a 45,350 Kg capacity blender with hydrating solution. The pump delivered the solution at a rate of about 6.4 Lpm. The solution was atomized by compressed air (620.5 N/M3)

from a pneumatic spray nozzle inside the blender. The High Temperature Rise STP powder (4,535 Kg) was added to the drum. Then, the Ultra High Temperature Rise powder (3,174.5 Kg) was added concurrently with the surfactant solution. Upon completing the addition of the solution, more High Temperature Rise powder (16,326 Kg) was added to the blender. The blender continuously fluidized the contents throughout the process.

The mixture was blended for 30 minutes, whereupon a sample was drawn for analysis. The temperature rise of the initial sample was 11.4° C. More Ultra High Temperature Rise powder (2,267.5 Kg) was added. After 30 more minutes a second sample was taken. Ths sample showed a temperature rise of 11.6° C. More Ultra High Temperature Rise powder (2,267.5 Kg) was added, and after further blending, a third sample was taken. An assay found the phosphate content to be 91.08% by weight tripolyphosphate, 4.95% by weight pyrophosphate, 3.22% by weight trimetaphosphate and a 0.75% by weight orthophosphate. Water content was measured by loss on drying (LOD). Temperature rise and rate of hydration were measured as described in Example 1. The results are set forth in the table below.

| SAMPLE | TEMPERATURE RISE (°C.) | RATE OIF 1-MINUTE | HYDRATION 5-MINUTE | LOD (wgt. %) |
| --- | --- | --- | --- | --- |
| 1 | 11.4 | 85.9° C. | 90.1° C. | 0.72 |
| 2 | 11.6 | 87.0° C. | 91.9° C. | 0.61 |
| 3 | 13.8 | 87.6° C. | 92.2° C. | 0.60 |

Figure 3:
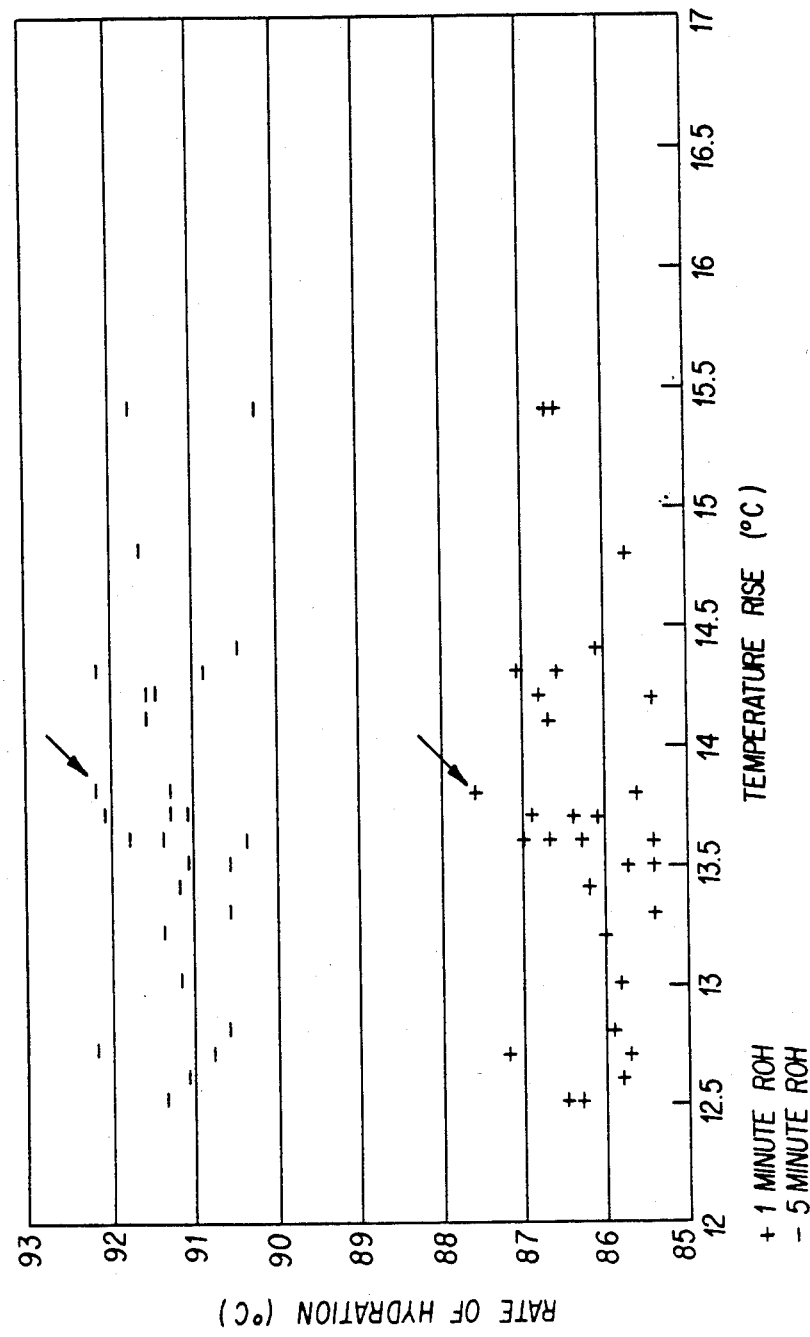
FIG. 3 is a graph plotting the one minute rate of hydration and five minute rate of hydration of several STP compounds against the temperature rise of the compositions.

FIG. 3 graphically shows the rate of hydration vs. temperature rise for routine samples taken from an STP plant in standard operation in accordance with Method 3 of Example 3 over six months. The values from sample 3, above, are plotted on the graph for comparison to the surfactant free compositions. The one minute rates of hydration are indicated by the +'s, while the five minute rates of hydration are indicated by the −'s. The sample 3 points are designated by the arrows.

EXAMPLE 5

Three blender batches of STP compositions (40,815 Kg per batch) were produced on a plant production scale by first adding anhydrous High Temperature Rise power (9,070 Kg) to a blender, then adding Ultra High Temperature Rise powder (4,535–9,070 Kg) with enough water (containing about 400 to 500 ppm Olin Poly-Tergent SLF-18 surfactant) to hydrate 40,815 Kg of composition. Finally, more anhydrous High Temperature Rise powder (18,140–22,675 Kg) is added. Assays showed that 92.35% by weight of the phosphate in the first batch was tripolyphosphate, 91.41% by weight of the phosphate in the second batch was tripolyphosphate, and 91.43% by weight of the phosphate in the third batch was tripolyphosphate. Samples were taken from the batches and tested as described in Examples 1 and 4. The results are shown in the table below.

| BATCH | TEMPERATURE RISE (°C.) | RATE OF 1-MINUTE | HYDRATION 5-MINUTE | LOD (wgt. %) |
| --- | --- | --- | --- | --- |
| 1 | 11.2 | 87.4° C. | 92.8° C. | 0.72 |
| 1 | 13.4 | 88.1° C. | 92.4° C. | 0.63 |
| 1 | 14.4 | 91.0° C. | 93.7° C. | 0.58 |
| 2 | 13.6 | 87.8° C. | 93.2° C. | 0.62 |
| 2 | 14.1 | 88.9° C. | 93.6° C. | 0.61 |
| 3 | 13.8 | 88.4° C. | 93.4° C. | 0.52 |

Caking tests were performed on samples of the above batches stored in molds for five days at ambient temperature and humidity, and at 60° C. and 80% humidity. The same tests were performed on samples taken from normal production (surfactant-free) in accordance with Method 3 of Example 3. The results were as follows:

| SAMPLE | AMBIENT TEMP., HUM. | 60° C., 80% RH |
| --- | --- | --- |
| Batch 1 | No Caking | No Caking |
| Batch 1 | No Caking | Very slight Caking |
| Batch 2 | No Caking | No Caking |
| Batch 2 | No Caking | No Caking |
| Batch 3 | No Caking | No Caking |
| Batch 3 | No Caking | No Caking |
| Normal Prodn. | Hard Cake | Hard Cake |
| Normal Prodn. | Soft Cake | Hard Cake |
| Normal Prodn. | Hard Cake | Hard Cake |

EXAMPLE 6

Samples were taken of STP compositions made according to Methods 1 and 2 of Example 3, some of the samples being moisturized to 0.5% by weight with surfactant-free water, and some being moisturized to about 0.5% by weight with water containing 500 ppm Olin Poly-Tergent SLF-18. The samples were stored in caking molds for five days at room temperature and ambient humidity. The following results were obtained:

| METHOD | SURFACTANT | CAKE QUALITY |
| --- | --- | --- |
| 1 | SLF-18 | Very Soft |
| 1 | None | Hard |
| 2 | SLF-18 | Very Soft |
| 2 | None | Soft |

Similar storate, but at 55° C., produced the following results:

| METHOD | SURFACTANT | CAKE QUALITY |
| --- | --- | --- |
| 1 | SLF-18 | Very Soft |
| 2 | SLF-18 | Very Soft |

Storage of samples (350 gms.) in 10.16 cm × 15.24 cm plastic bags in a 55° C. oven for two weeks yielded the following results:

| METHOD | SURFACTANT | POWDER QUALITY |
| --- | --- | --- |
| 1 | SLF-18 | Free-flowing, no caking |
| 1 | None | Lumps, some caking |
| 2 | SLF-18 | Free-flowing |
| 2 | None | Soft lumps, slight caking |

The last test was repeated with the following results:

| METHOD | SURFACTANT | POWDER QUALITY |
| --- | --- | --- |
| 1 | SLF-18 | Soft cake, small, hard lumps |
| 1 | None | Caked, large lumps |
| 1 | SLF-18 | No caking |
| 1 | SLF-18 | No caking |
| 2 | None | No caking, poor flow |
| 2 | SLF-18 | No caking, good flow |

EXAMPLE 7

Low Temperature rise (low Phase I content) STP composition was formed on a plant production scale in accordance with the procedures outlined in Example 1. Unmoisturized samples and samples moisturized with water containing varying amounts of Aerosol OT or Olin Poly-Tergent SLF-18 surfactants were tested as described in Example 1 with the following results:

| WATER CONTENT IN SAMPLE (wgt. %) | SURFACTANT | SURFACTANT CONTENT IN SAMPLE | RATE OF 1-MINUTE (°C.) | HYDRATION 5-MINUTE (°C.) |
| --- | --- | --- | --- | --- |
| 0 | — | — | 80.97 | 78.79 |
| 0.5 | — | 0 | 80.66 | 86.97 |
| 0.5 | Aerosol OT | 2.5 ppm | 82.28 | 89.46 |
| 0.5 | Aerosol OT | 5.0 ppm | 83.26 | 90.92 |
| 0.5 | SLF-18 | 5.0 ppm | 81.79 | 90.13 |

The same tests were performed with High Temperature Rise STP (TR of 12.5). The results were as follows:

| WATER CONTENT IN SAMPLE (wgt. %) | SURFACTANT | SURFACTANT CONTENT IN SAMPLE | RATE OF 1-MINUTE (°C.) | HYDRATION 5-MINUTE (°C.) |
| --- | --- | --- | --- | --- |
| 0 | — | — | 82.34 | 80.30 |
| 0.5 | — | 0 | 81.86 | 83.23 |
| 0.5 | Aerosol OT | 500 ppm | 87.96 | 92.51 |
| 0.5 | Aerosol OT | 5 ppm | 86.23 | 91.87 |

High Temperature Rise (TR of 15.5) STP composition was formed on a plant production scale in accordance with the procedures of Method 1 outlined in Example 3. Samples moisturized with water containing varying amounts of Olin Poly-Tergent SLF-18 surfactants were tested as described in Example 1 with the following results. The water content of the samples as measured by ther loss on drying method was 0.323% by weight. An assay showed the STP content of the samples to be 93.3% by weight.

| SURFACTANT CONTENT IN SAMPLE | RATE OF 1-MINUTE (°C.) | HYDRATION 5-MINUTE (°C.) |
| --- | --- | --- |
| 0 | 87.56 | 91.55 |
| 500 ppm | 87.60 | 92.49 |
| 5 ppm | 88.42 | 93.38 |

EXAMPLE 9

Olin Poly-Tergent SLF-18 (50 gms.) was mixed into water (94.6 L) to produce moisturizing water containing 500 ppm surfactant. STP composition was prepared according to Method 1 of Example 3. Samples were taken hourly during the blending and tested as described in Example 1. The results are set forth in the following table.

| TEMPERATURE RISE (°C.) | WATER CONTENT (wgt. %) LOD | RATE OF 1-MINUTE | HYDRATION 5-MINUTE |
| --- | --- | --- | --- |
| 9.9 | 0.55 | | |
| 11.2 | 0.35 | 84.2 | 89.2 |
| 13.5 | 0.40 | 86.8 | 91.7 |
| 15.7 | 0.61 | 90.1 | 93.2 |
| 17.6 | 0.39 | 90.4 | 93.5 |
| 18.4 | 0.37 | 90.1 | 93.3 |
| 16.6 | 0.35 | 89.1 | 92.8 |
| 15.8 | 0.34 | 87.4 | 92.3 |
| 15.1 | 0.36 | 86.4 | 92.2 |
| 14.4 | 0.44 | 85.5 | 91.9 |
| 12.6 | 0.40 | 86.3 | 92.5 |
| 13.1 | 0.45 | 86.4 | 92.4 |
| 14.0 | 0.42 | 86.8 | 92.7 |
| 13.7 | 0.47 | 86.7 | 92.3 |
| 13.5 | 0.45 | 87.2 | 97.7 |
| 15.4 | 0.42 | 88.3 | 93.6 |
| 16.3 | 0.48 | 88.5 | 93.5 |
| 15.4 | 0.41 | 88.0 | 93.4 |
| 16.0 | 0.49 | 88.9 | 92.8 |
| 18.8 | 0.42 | 89.8 | 93.3 |
| 19.8 | 0.44 | 90.4 | 93.6 |
| 19.3 | 0.42 | 90.2 | 93.6 |
| 19.3 | 0.40 | 90.2 | 93.4 |
| 19.0 | 0.46 | 89.7 | 93.2 |
| 16.6 | 0.41 | 88.6 | 92.8 |
| 18.0 | 0.50 | 89.9 | 93.2 |
| 11.3 | 0.42 | 85.0 | 91.9 |
| 11.4 | 0.35 | 85.0 | 92.5 |
| 13.1 | 0.40 | 86.0 | 92.8 |
| 17.8 | 0.36 | 86.7 | 93.3 |
| 17.0 | 0.38 | 86.8 | 93.5 |
| 14.1 | 0.32 | 87.9 | 93.5 |
| 15.1 | 0.36 | 88.3 | 93.8 |

EXAMPLE 10

A granular, fully hydrated phosphate composition, useful in a slurry detergent formulation, was prepared employing the equipment and procedure of Example 1. The water sprayed onto a sample of STP contained 500 ppm of Olin Poly-Tergent SLF-18 surfactant to provide a final water content of about 21.17%, by weight, and about 110 ppm surfactant. No caking occurred in the mixer and the resulting sample was found to be non-caking, granular material without evidence of lumping. The fully hydrated product was tested in a typical slurry detergent formulation comprising sodium hydroxide, surfactant, clay, sodium silicate, water and the sodium tripolyphosphate and found to be acceptable in producing a smooth, grit free, non-separating slurry.

In view of the above, it will be seen that the several objects of the invention are achieved and other advantageous results attained.

As various changes could be made in the above compositions and methods without departing from the scope of the invention, it is intended that all matter contained in the above description or shown in the accompanying drawings shall be interpreted as illustrative and and not a limiting sense.

What is claimed is:

1. A composition of matter in particulate, crystalline form, free-flowing during storage and prolonged exposure to ordinary ambient temperature and humidity conditions, having an increased rate of hydration and resistance to caking comprising sodium tripolyphosphate, and from about 0.1% by weight and about 23% by weight added water in the form of water of hydration, said water containing in solution sufficient surfactant to provide the composition with from about 0.2 ppm to about 125 ppm surfactant.

2. A composition as set forth in claim 1 having a one-minute rate of hydration of above about 92° C.

3. A composition as set forth in claim 1 wherein the hydrate-forming phosphate comprises Phase II sodium tripolyphosphate.

4. A composition as set forth in claim 1 wherein the hydrate-forming phosphate comprises a mixture of Phase I and Phase II sodium tripolyphosphate.

5. A composition as set forth in claim 1 further comprising at most about 0.1% by weight free water.

6. A powder composition as set forth in claim 1 in which at least 60% of the particles are smaller than 270 mesh, and essentially all of the particles are smaller than 60 mesh.

7. A composition as set forth in claim 1 in which at least 40% of the particles are larger than 60 mesh, and essentially all of the particles are larger than 100 mesh.

8. A composition as set forth in claim 1 wherein the phosphate is fully hydrated.

9. A composition as set forth in claim 1 containing between about 0.5 percent by weight and about 2 percent by weight water and the surfactant is present in an amount between 1 ppm and about 10 ppm.

10. A composition as set forth in claim 9 wherein the composition is a powder having at least 60% of the particles smaller than 270 mesh, and essentially all of the particles smaller than 60 mesh and has a one-minute rate of hydration of above about 85° C. and a five-minute rate of hydration of above about 92° C.

11. A composition as set forth in claim 1 wherein the phosphate is sodium tripolyphosphate and the water content is in the range of from about 12% to about 23%.

12. A composition as set forth in claim 11 wherein the surfactant is present in the range of from about 100 ppm to about 125 ppm.

13. A composition of matter in particulate, crystalline form, free-flowing during storage and prolonged exposure to ordinary ambient temperature and humidity conditions, having an increased rate of hydration and resistance to caking comprising sodium tripolyphosphate, between about 0.1% by weight and about 4% by weight water in the form of water of hydration and between about 0.2 ppm and about 20 ppm of a surfactant in the composition.

14. A granular sodium tripolyphosphate composition free-flowing during storage and prolonged exposure to ordinary ambient temperature and humidity conditions, having an increased rate of hydration and resistance to caking comprising from about 21% to about 23% added water, said water containing in solution sufficient surfactant to provide the composition from about 100 ppm to about 125 ppm surfactant in the composition.

* * * * *